US012147971B2

(12) United States Patent
Fiesinger

(10) Patent No.: US 12,147,971 B2
(45) Date of Patent: Nov. 19, 2024

(54) SECURE PRODUCT PROVISIONING SYSTEMS AND METHODS FOR PREVENTING ELECTRONIC FRAUD BY GENERATION OF EPHEMERAL VIRTUAL CARDS FOR INJECTION FROM SECURE PROXY ACCOUNTS INTO ELECTRONIC PROVISIONING NETWORKS

(71) Applicant: The Procter & Gamble Company, Cincinnati, OH (US)

(72) Inventor: Brooks R. Fiesinger, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 382 days.

(21) Appl. No.: 17/541,403

(22) Filed: Dec. 3, 2021

(65) Prior Publication Data
US 2022/0198438 A1 Jun. 23, 2022

Related U.S. Application Data

(60) Provisional application No. 63/127,174, filed on Dec. 18, 2020.

(51) Int. Cl.
*G06Q 30/00* (2023.01)
*G06Q 20/12* (2012.01)
(Continued)

(52) U.S. Cl.
CPC ........... *G06Q 20/351* (2013.01); *G06Q 20/12* (2013.01); *G06Q 20/326* (2020.05);
(Continued)

(58) Field of Classification Search
CPC .... G06Q 20/351; G06Q 20/326; G06Q 21/12; G06Q 20/385; G06Q 30/0605; G06Q 30/0641
See application file for complete search history.

(56) References Cited

U.S. PATENT DOCUMENTS 9,129,118 B1 * 9/2015 Johansson ........... G06F 21/6245
2014/0164091 A1 * 6/2014 Hunt ................... G06Q 30/0232
705/14.32

(Continued)

FOREIGN PATENT DOCUMENTS

JP 2021096735 A 6/2021
JP 2021096736 A 6/2021

OTHER PUBLICATIONS

Sung, Soonhwa, Eunbae Kong, and Cheong Youn. "Mobile Payment Based on Transaction Certificate Using Cloud Self-Proxy Server." ETRI journal 39.1 (2017): 135-144.*

*Primary Examiner* — Kathleen Palavecino
(74) *Attorney, Agent, or Firm* — Daniel S. Albrecht

(57) ABSTRACT

Secure product provisioning systems and methods are described for preventing electronic fraud by generation of ephemeral virtual cards for injection from secure proxy accounts into electronic provisioning networks. A provisioning server receives a provisioning request from a provisioning application (app) that indicates a product selected from one or more products and a merchant selected from one or more merchants. The server generates an ephemeral virtual card comprising a unique ephemeral code and a payment amount, each injected from a secure proxy account accessible only by the provisioning server. The ephemeral virtual card virtually emulates a physical or electronic card acceptable by the electronic provisioning network of the merchant. The provisioning server submits the ephemeral virtual card to the electronic provisioning network of the merchant. The receipt of the ephemeral virtual card causes initiation of a transaction between a user and the merchant for the product.

24 Claims, 7 Drawing Sheets

(51) Int. Cl.
*G06Q 20/32* (2012.01)
*G06Q 20/34* (2012.01)
*G06Q 20/38* (2012.01)
*G06Q 30/0601* (2023.01)

(52) U.S. Cl.
CPC ....... *G06Q 20/385* (2013.01); *G06Q 30/0633* (2013.01); *G06Q 30/0641* (2013.01)

(56) References Cited

U.S. PATENT DOCUMENTS

| | | | | |
|---|---|---|---|---|
| 2016/0358173 | A1* | 12/2016 | Morgan | G06Q 20/3255 |
| 2021/0019755 | A1* | 1/2021 | Omojola | G06Q 20/12 |
| 2022/0138725 | A1* | 5/2022 | Sneider | G06Q 20/405 |
| | | | | 705/41 |
| 2022/0292503 | A1* | 9/2022 | Brock | G06Q 20/4018 |

* cited by examiner

```
300 ↘
POST https://www.VirtualCardServer.com/d/Card/3934 -H "Content-Type: application/json" -H "Accept: application/json" -H "Auth: auth_token_here" -d '{
  "Amount": 45.50,
  "exactAmount": true,
  "numberOfTransactions": 4,
  "firstName": "Michael",
  "lastName": "Jones",
  "Expiration Month": 2,
  "Expiration year": 2021
}'
```

```
{
    "amount": 45.50,
    "blocked": false,
    "cardNumber": "1234123455422214",
    "created": "2021-1-19T1:10:17Z",
    "cvc2": "111",
    "exactAmount": true,
    "expirationMMYY": "0221",
    "externalToken": "111111111",
    "firstName": "Michael",
    "id": 650125,
    "invoiceNumber": 12345,
    "lastFour": "2214",
    "lastName": "Jones",
    "notes": "null",
    "numberofTransactions": 4,
    "poNumber": 5679,
    "usageTypes": [
        "Miscellaneous",
        "Retailer"
    ]
}
```

FIG. 3B

POST https://www.VirtualCardServer.com/d/Card/3934 -H "Content-Type: application/json" -H "Accept: application/json" -H "Auth: auth_token_here"

```
[ {
    "id": 68491,
    "acceptLocation": "Merchant 1"
152-548-6378 OH",
    "accountCode": "84667",
    "active": true,
    "approvalCode": "0",
    "cardExpireDate": "0221",
    "cardholderName": "STASHCARD 1111",
    "check Number": "1111",
    "companyId": 740,
    "corporateCode": "uXP333",
    "correctiveAction": "VERIFY USAGE LIMITS
AND ADJUST CARD PROFILE",
    "customerId": "PADF",
    "declineCode": "939",
    "declineMessage": "MCC IS NOT AVAILABLE F
OR USE",
    "expenseId": null,
    "invoiceNumber": "1111",
    "lastFour": null,
    "mccDecription": "Merchant 1",
    "mccGroup": "86498",
    "mccNumber": null,
    "merchantAddress": " ",
    "merchantCity": " ",
    "merchantName": " ",
    "merchantZip": " ",
    "merchantInvoicesonCheck": 1,
    "outstanding": false,
    "paybleBy": "Product Brand Owner",
    "paybleTo": "Joe Doe",
    "paymentIdentifier": "89491:1111:0909",
    "postedAmount": 0.00,
    "postedDate": null,
    "preAuthAmount": 50.00,
    "processed": true,
    "promptedId": " ",
    "recipientEmailAddress": "Recipient@UserEmail.com"
    "reversalFlag" "N"
    "timeStamp": "2021-01-18T01:33:19+0000",
    "token": "697B33R5X9"
    "totalCheckAmount": 55.60,
    "totalDiscountAmount": 0.00,
    "totalGrossAmount": 55.60,
    "transactionDate": "2020-08-14T03:19:11+0000"
    "transactionStatus": "Declined",
    "variance": false,
    "vendorCode": "111",
    "vendorName": "Joe Doe",
    "virtualCardId": 65984
} ]
```

SECURE PRODUCT PROVISIONING SYSTEMS AND METHODS FOR PREVENTING ELECTRONIC FRAUD BY GENERATION OF EPHEMERAL VIRTUAL CARDS FOR INJECTION FROM SECURE PROXY ACCOUNTS INTO ELECTRONIC PROVISIONING NETWORKS

CROSS REFERENCE TO RELATED APPLICATION

This application claims the benefit of U.S. Provisional Application No. 63/127,174, filed Dec. 18, 2020, the substance of which is incorporated herein by reference.

FIELD

The present disclosure generally relates to secure product provisioning systems and methods, and more particularly to, secure product provisioning systems and methods for preventing electronic fraud by generation of ephemeral virtual cards for injection from secure proxy accounts into electronic provisioning networks.

BACKGROUND

Generally, consumers or users of online retail or other such electronic platforms must provide private or otherwise personal information, such as electronic payment information and/or other personal identifiable information (PII), to a merchant or other party in order to complete an online transaction or engage in electronic services. Such private information may include credit card information, personal information (e.g., address information, etc.), or other PII that is transmitted over communication networks directly to a merchant platform.

A problem arises, however, given that transmission of PII or other private information over a public computing network, such as the Internet, can create security and privacy risks. Such security and privacy risks may include a third-party, such as a hacker, automated "sniffing" program, or other bad faith third-party, intercepting, altering, or otherwise tampering with a user's private information. This issue is exacerbated where a given user engages in multiple transactions with multiple merchants each having different online destinations or electronic platforms, each of which may receive, store, and/or transmit the user's secure information across public networks, such as the Internet, in different ways. Still further, these issues are exacerbated where a given user routinely transmits private information or PII, thereby increasing the opportunity of bad faith third-parties from intercepting the user's information and using it in negative way, detrimental to the user and/or the merchant.

For the foregoing reasons, there is a need for secure product provisioning systems and methods for preventing electronic fraud by generation of ephemeral virtual cards for injection from secure proxy accounts into electronic provisioning networks.

SUMMARY

Generally, as described herein, secure product provisioning systems and methods are described for preventing electronic fraud by generation of ephemeral virtual cards for injection from secure proxy accounts into electronic provisioning networks. Such secure product provisioning systems and methods provide a reduced public network footprint for a given user, where the user, using his or her computing device in accordance with the secure provisioning systems and methods described herein, may electronically transmit and receive fewer payloads and/or protected information. Instead, a secured provisioning server handles such information via unique data injection of private information in an electronically safe way. Data injection of the user's private information creates a unique and time-sensitive networked data object, referred to herein as an "ephemeral virtual card," that can be transmitted, on behalf of a user, to one or more merchants or services in a safe and network controlled manner. In some embodiments, using data obfuscation may be applied to the user's secure information to further hide or protect the user's PII. For example, data obfuscation maybe as applied to a user's true location information, such as zip code information, where a different or surrogate zip code may be used, at least temporarily or as part of a separate data transmission, to hide or separate a user's PII. Such measures mitigate interception and/or detrimental use of a user's information by bad faith third parties.

The secure product provisioning systems and methods also provide users with platform related benefits that protect and secure user information when providing sensitive information online. For example, in embodiments involving a retail or shopping platform, such secure product provisioning systems and methods provide a secure environment for storing and transmitting sensitive information. In some embodiments, such provisioning systems and methods encourage subscription-based loyalty incentives for an operator or owner of the provisioning systems and methods to drive long term user retention and size conversions through an intuitive subscription experience. User information may be protected and, using data injection and ephemeral virtual cards, may be securely and/or safely provided to merchants or retailers for order fulfilment.

In various embodiments, the provisioning systems and methods described herein protect user information at a provisioning server or platform (e.g., as owned or operated by a manufacturer, supplier, or brand owner of certain products, for example, diapers). The provisioning server or platform collects and stores the user's secure information. Such information is not transmitted or shared until order fulfillment, thereby keeping secure the user's information. When the information is needed for fulfillment, an ephemeral virtual card is generated comprising a unique ephemeral code and a payment amount, wherein the payment amount is injected from a secure proxy account accessible only by the provisioning server or platform. The information may then be securely provided to one or more specific merchant's electronic provisioning network for order fulfillment. A user can use a provisioning application (app) to communicate with a secured provisioning server or platform. The provisioning app may be a native application implemented or execution of a mobile device (e.g., APPLE iOS based mobile device and/or GOOGLE ANDROID based mobile device) of a user. The provisioning app may provide a simulated environment, such as a simulated shopping environment, where the user can communicate and interact with the provisioning server or platform while at the same time keeping his or her secure information protected at the provisioning server or platform. Only when a user is ready to engage in a transaction or purchase would the user's information be injected into an ephemeral virtual card and submitted with a retailer or merchant for order fulfillment. In this way, such transaction provides a simulated and secure shopping experience. For example, a user may make secure purchases via the provisioning app and/or learn about products (e.g., a diaper product of a given manufacturer, brand, or supplier) in a secure manner, while the provisioning system handles the underlying security via ephemeral virtual card(s) as described herein.

More specifically, as described herein, a secure product provisioning system is disclosed. The secure product provisioning system is configured to prevent electronic fraud by generation of ephemeral virtual cards for injection from secure proxy accounts into electronic provisioning networks. The secure product provisioning system may include a provisioning server comprising one or more processors and one or more memories. The provisioning server may be communicatively coupled via a computer network to one or more merchant electronic provisioning networks. Each of the one or more merchant electronic provisioning networks may correspond to one or more merchants. The secure product provisioning system may further include a provisioning application (app) comprising computing instructions configured for implementation on a client device of a user. The provisioning app may be communicatively coupled via the computer network to the provisioning server. The provisioning app may comprise a graphic user interface (GUI) configured to display, on a screen of the client device, one or more products to be provided by the one or more merchants. The secure product provisioning system may further include computing instructions configured to execute on the one or more processors of the provisioning server, wherein the computing instructions, when executed by the one or more processors, cause the provisioning server to: receive a provisioning request from the provisioning app. The provisioning request may indicate a product selected from the one or more products and a merchant selected from the one or more merchants. The computing instructions may further be configured to execute on the one or more processors of the provisioning server, to cause the provisioning server to: generate an ephemeral virtual card comprising a unique ephemeral code and a payment amount. The payment amount may be injected from a secure proxy account accessible only by the provisioning server. The ephemeral virtual card may virtually emulate a physical or electronic card acceptable by the electronic provisioning network of the merchant. The computing instructions may further be configured to execute on the one or more processors of the provisioning server, to cause the provisioning server to submit the ephemeral virtual card to the electronic provisioning network of the merchant. The receipt of the ephemeral virtual card may cause initiation of a transaction between the user and the merchant for the product.

In addition, as described herein, a secure product provisioning method is disclosed for preventing electronic fraud by generation of ephemeral virtual cards for injection from secure proxy accounts into electronic provisioning networks. The secure product provisioning method comprises receiving, at a provisioning server communicatively coupled via a computer network to one or more merchant electronic provisioning networks corresponding to one or more merchants, a provisioning request from a provisioning application (app). The provisioning app may comprise: (a) computing instructions configured for implementation on a client device of a user, and (b) a graphic user interface (GUI) configured to display, on a screen of the client device, one or more products to be provided by the one or more merchants. A provisioning request may indicate a product selected from the one or more products and a merchant selected from one or more merchants. The secure product provisioning method may further comprise generating, via the provisioning server, an ephemeral virtual card comprising a unique ephemeral code and a payment amount. The payment amount may be injected from a secure proxy account accessible only by the provisioning server. The ephemeral virtual card may virtually emulate a physical or electronic card acceptable by the electronic provisioning network of the merchant. The secure product provisioning method may further comprise submitting, via the provisioning server, the ephemeral virtual card to the electronic provisioning network of the merchant. The receipt of the ephemeral virtual card may cause initiation of a transaction between the user and the merchant for the product.

Further, as described herein, a tangible, non-transitory computer-readable medium storing instructions for preventing electronic fraud by generation of ephemeral virtual cards for injection from secure proxy accounts into electronic provisioning networks is disclosed. The instructions, when executed by one or more processors of a provisioning server, may cause the one or more processors (e.g., of the server) to receive a provisioning request from a provisioning application (app). The provisioning app may comprise: (a) computing instructions configured for implementation on a client device of a user, and (b) a graphic user interface (GUI) configured to display, on a screen of the client device, one or more products to be provided by the one or more merchants. The provisioning request may indicate a product selected from the one or more products and a merchant selected from one or more merchants. The provisioning server may be communicatively coupled via a computer network to the one or more merchant electronic provisioning networks corresponding to one or more merchants. The instructions, when executed by one or more processors of a provisioning server, may further cause the one or more processors (e.g., of the server) to generate an ephemeral virtual card comprising a unique ephemeral code and a payment amount. The payment amount may be injected from a secure proxy account accessible only by the provisioning server. The ephemeral virtual card may virtually emulate a physical or electronic card acceptable by the electronic provisioning network of the merchant. The instructions, when executed by one or more processors of a provisioning server, may further cause the one or more processors (e.g., of the server) to submit the ephemeral virtual card to the electronic provisioning network of the merchant. The receipt of the ephemeral virtual card may cause initiation of a transaction between the user and the merchant for the product.

In accordance with the above, and with the disclosure herein, the present disclosure describes improvements in computer functionality or in improvements to other technologies at least because the disclosure describes that, e.g., a provisioning server, or otherwise computing device (e.g., a user computer device), is improved where the provisioning server is configured to prevent electronic fraud by generation of ephemeral virtual cards for injection from secure proxy accounts into electronic provisioning networks. That is, secure information such a unique ephemeral code and a payment amount is injected from a secure proxy account accessible only by the provisioning server. In various embodiments, the ephemeral virtual card virtually emulates a physical or electronic card acceptable by the electronic provisioning network of the merchant. An ephemeral virtual card is fraud proof because once a virtual card is processed it is no longer valid. The ephemeral virtual card can also be locked at a specific amount and retailer type, which is acknowledged and checked for security and consistency by the provisioning server itself or ephemeral virtual card server commutatively coupled to the provisioning server.

The secured provisioning server is enhanced with computing instructions allowing it to interact with or otherwise process ephemeral virtual card(s) to increase the security of the provisioning server, by resisting attacks from third parties (e.g., hackers).

For similar reasons, the present disclosure relates to improvement to other technologies or technical fields at least because the present disclosure describes or introduces improvements to computing devices, e.g., the provisioning server(s), where the provisioning server(s) may interact with existing merchant electronic provisioning network(s) thereby requiring minimal or no additional coding, overhead, processing resources, and/or memory of either the electronic provisioning network of the merchant and/or the provisioning server(s). That is, the secure product provisioning systems and methods describe herein may be implemented by communicating with existing merchant electronic provisioning networks thereby adding substantial functionality to the provisioning server without requiring retailer system interface or change. This decreases processor and memory requirements of both existing merchant electronic provisioning networks and provisioning server(s) at least because little or no additional code needs to be executed on processors or stored in memory of such systems for the purposes of customized, secured communication, as described herein.

In addition, the present disclosure includes specific features other than what is well-understood, routine, or conventional activity in the field, by adding unconventional steps that confine the claim to a particular useful application, e.g., preventing electronic fraud by generation of ephemeral virtual cards for injection from secure proxy accounts into electronic provisioning networks.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 3A illustrates example computing instructions for generating an ephemeral virtual card, in accordance with various embodiments disclosed herein.

FIG. 3B illustrates an example ephemeral virtual card generated based on execution of the computing instructions as described for FIG. 3A, and in accordance with various embodiments disclosed herein.

FIG. 3C illustrates example computing instructions for checking status or activity of an ephemeral virtual card, in accordance with various embodiments disclosed herein.

FIG. 3D illustrates an example validity response indicating an error as to the ephemeral virtual card of FIG. 3C, and in accordance with various embodiments disclosed herein.

The Figures depict preferred embodiments for purposes of illustration only. Alternative embodiments of the systems and methods illustrated herein may be employed without departing from the principles of the invention described herein.

DETAILED DESCRIPTION OF THE INVENTION

Figure 1:
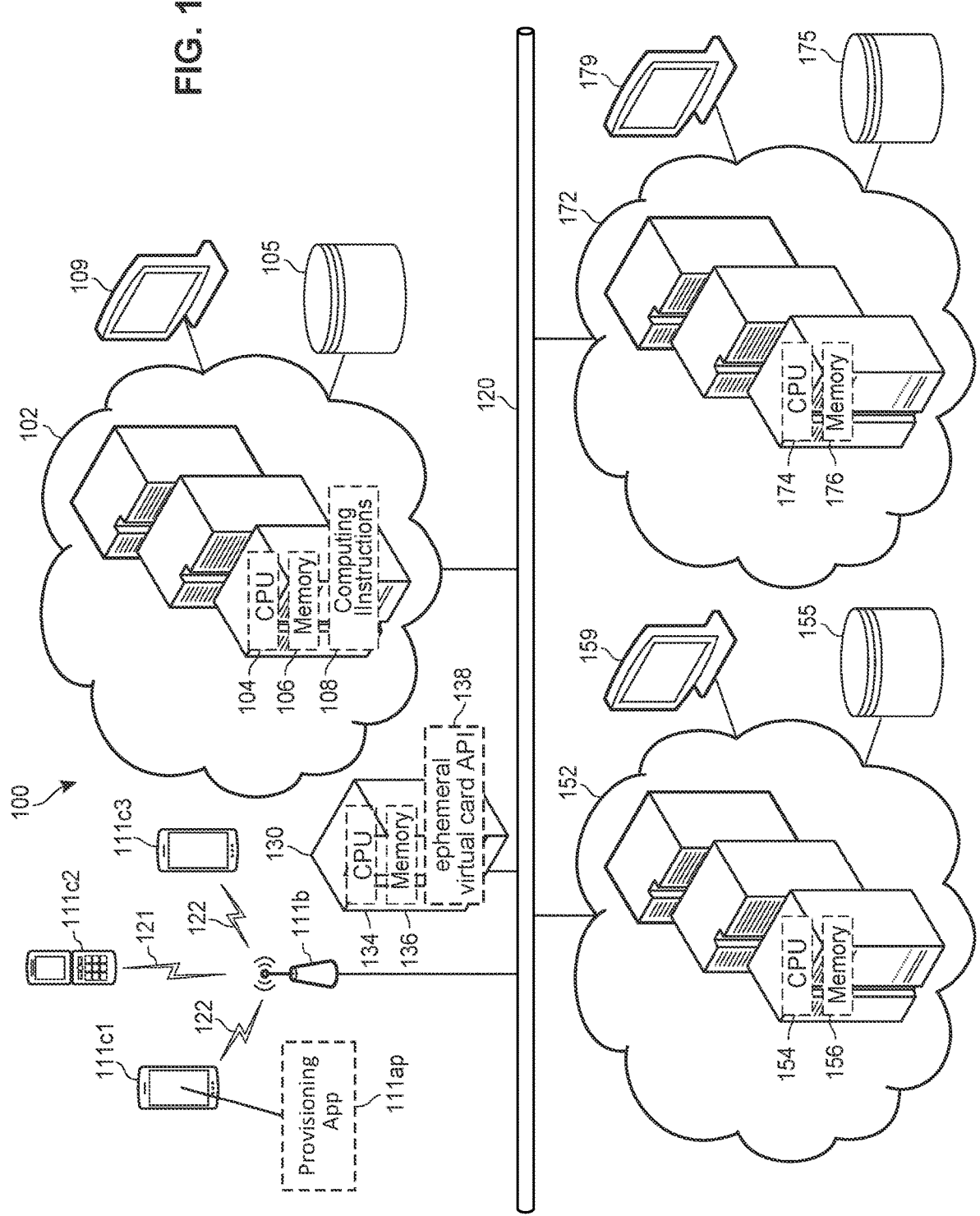
FIG. 1 illustrates an example secure product provisioning system configured to prevent electronic fraud by generation of ephemeral virtual cards for injection from secure proxy accounts into electronic provisioning networks, in accordance with various embodiments disclosed herein.

FIG. 1 illustrates an example secure product provisioning system 100 configured to prevent electronic fraud by generation of ephemeral virtual cards for injection from secure proxy accounts into electronic provisioning networks, in accordance with various embodiments disclosed herein. Provisioning system 100 comprises one or more provisioning server(s) 102. Provisioning server(s) 102 comprise one or more processor(s) 104 or central process units (CPUs) and one or more memories (106). Provisioning server(s) 102 is communicatively coupled via a computer network 120 to one or more merchant electronic provisioning network(s) (e.g., merchant server(s) 152 and merchant server(s) 172). Each of the merchant electronic provisioning network(s) (e.g., merchant server(s) 152 and merchant server(s) 172) may correspond to one or more merchants (e.g., merchants may refer to retailers, including, by way of non-limiting example, any one or more of WALMART, AMAZON, CVS, TARGET, ALIBABA, or the like).

In the example embodiment of FIG. 1, secure product provisioning system 100 includes server(s) 102, which may comprise one or more computer servers. In various embodiments server(s) 102 comprise multiple servers, which may comprise multiple, redundant, or replicated servers as part of a server farm. In still further embodiments, server(s) 102 may be implemented as cloud-based servers, such as a cloud-based computing platform. For example, provisioning server(s) 102 may be any one or more cloud-based platform(s) such as MICROSOFT AZURE, AMAZON AWS, or the like. Server(s) 102 may include one or more processor(s) 104 as well as one or more computer memories 106. In various embodiments, server(s) 102 may be referred to herein as "provisioning server(s)" and/or a "provisioning platform."

Memory(ies) 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. Memory(ies) 106 may store an operating system (OS) (e.g., MICROSOFT WINDOWS, LINUX, UNIX, etc.) capable of facilitating the functionalities, apps, methods, or other software as discussed herein. Memory(ies) 106 may store machine readable instructions, including any of one or more application(s) (e.g., an provisioning application as described herein and/or applications that communicate with the provisioning application as described herein), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be configured to facilitate their various functionalities discussed herein. It should be appreciated that one or more other applications may be envisioned and that are executed by the processor(s) 104.

Processor(s) 104 may be connected to the memory(ies) 106 via a computer bus responsible for transmitting and/or receiving electronic data, data packets, or otherwise electronic signals to and from the processor(s) 104 and memory(ies) 106 in order to implement or perform the machine readable instructions, methods, processes, elements or limitations, as illustrated, depicted, or described for the various flowcharts, illustrations, diagrams, figures, and/or other disclosure herein.

Processor(s) 104 may interface with memory(ies) 106 via the computer bus to execute an operating system (OS). Processor(s) 104 may also interface with the memory(ies) 106 via the computer bus to create, read, update, delete, or otherwise access or interact with the data stored in memories 106 and/or the database 104 (e.g., a relational database, such as Oracle, DB2, MySQL, or a NoSQL based database, such as MongoDB). The data stored in memory(ies) 106 and/or database 105 may include all or part of any of the data or information described herein, including, for example, information or data related to users, products, merchants, and/or as otherwise described herein.

Provisioning server(s) 102 may further include a communication component configured to communicate (e.g., send and receive) data or information (e.g., for rendering or visualizing on a GUI, etc.) via one or more external/network port(s) to one or more networks or local terminals, such as computer network 120 and/or terminal 109 as described herein. In some embodiments, provisioning server(s) 102 may include a client-server platform technology such as ASP.NET, Java J2EE, Ruby on Rails, Node.js, a web service or online API, responsive for receiving and responding to electronic requests. The provisioning server(s) 102 may implement the client-server platform technology that may interact, via the computer bus, with the memory(ies) 106 (including the applications(s), component(s), API(s), data, etc. stored therein) and/or database 105 to implement or perform the machine readable instructions, methods, processes, elements or limitations, as illustrated, depicted, or described for the various flowcharts, illustrations, diagrams, figures, and/or other disclosure herein.

In various embodiments, the provisioning server(s) 102 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to computer network 120. In some embodiments, computer network 120 may comprise a private network or local area network (LAN). Additionally, or alternatively, computer network 120 may comprise a public network such as the Internet.

Provisioning server(s) 102 may further include or implement an operator interface configured to present information to an administrator or operator and/or receive inputs from the administrator or operator. As shown in FIG. 1, an operator interface may provide a display screen (e.g., via terminal 109). Provisioning server(s) 102 may also provide I/O components (e.g., ports, capacitive or resistive touch sensitive input panels, keys, buttons, lights, LEDs), which may be directly accessible via, or attached to, provisioning server(s) 102 or may be indirectly accessible via or attached to terminal 109. According to some embodiments, an administrator or operator may access the server 102 via terminal 109 to review information, make changes, and/or perform other functions.

As described herein, in some embodiments, provisioning server(s) 102 may perform the functionalities as discussed herein as part of a "cloud" network or may otherwise communicate with other hardware or software components within the cloud to send, retrieve, or otherwise analyze data or information described herein.

In general, a computer program or computer based product, application, or code (e.g., the provisioning application, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor(s) 104 (e.g., working in connection with the respective operating system in memory(ies) 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

As shown in FIG. 1, provisioning server(s) 102 are communicatively connected, via computer network 120 to the one or more user computing devices 111c1-111c3 via base station 111b. In some embodiments, base station 111b may comprise a cellular base station, such as cell towers, communicating to the one or more user computing devices 111c1-111c3 via wireless communications 121 based on any one or more of various mobile phone standards, including NMT, GSM, CDMA, UMMTS, LTE, 5G, or the like. Additionally, or alternatively, base station 111b may comprise routers, wireless switches, or other such wireless connection points communicating to the one or more user computing devices 111c1-111c3 via wireless communications 122 based on any one or more of various wireless standards, including by non-limiting example, IEEE 802.11a/b/c/g (WIFI), the BLUETOOTH standard, or the like.

Any of the one or more user computing devices 111c1-111c3 may comprise mobile devices and/or client devices for accessing and/or communications with provisioning server(s) 102. Such mobile devices may comprise one or more mobile processor(s) and/or a digital camera for capturing images. In various embodiments, user computing devices 111c1-111c3 and/or 112c1-112c3 may comprise a mobile phone (e.g., a cellular phone), a tablet device, a personal data assistance (PDA), or the like, including, by non-limiting example, an APPLE iPhone or iPad device or a GOOGLE ANDROID based mobile phone or tablet.

In various embodiments, the one or more user computing devices 111c1-111c3 and/or 112c1-112c3 may implement or execute an operating system (OS) or mobile platform such as Apple's iOS and/or Google's Android operation system. Any of the one or more user computing devices 111c1-111c3 and/or 112c1-112c3 may comprise one or more processors and/or one or more memories for storing, implementing, or executing computing instructions or code, e.g., a mobile application (app), as described in various embodiments herein. For example, as shown in FIG. 1, provisioning app 111ap (or at least a portion thereof) or otherwise provisioning computing instructions as described herein, may be stored locally on a memory of a user computing device (e.g., user computing device 111c1). In various embodiments, provisioning app 111ap comprises computing instructions configured for implementation on a client device of a user. Provisioning app 111ap may comprise any one or more of a web browser application or a mobile application. In some embodiments, where a client device is a desktop device, provisioning app may comprise a desktop application. The provisioning app may be coupled via computer network 120 to provisioning server (e.g., server(s) 102). Provisioning app 111ap may comprise a graphic user interface (GUI) configured to display, on a screen of the client device, one or more products to be provided by the one or more merchants (e.g., merchants operating merchant server(s) 152 and merchant server(s) 172 described herein).

User computing devices 111c1-111c3 may comprise a wireless transceiver to receive and transmit wireless communications 121 and/or 122 to and from base station 111b. In various embodiments, data and information, e.g., related to user selections, product data, merchant data, submission data, transaction data, and/or as otherwise described herein may be transmitted via computer network 120 to provisioning server(s) 102, ephemeral virtual card server 130, and/or merchant electronic provisioning network(s) 152 and 172 as described herein.

Still further, each of the one or more user computer devices 111c1-111c3 and/or 112c1-112c3 may include a display screen for displaying graphics, images, text, products, product information, data, pixels, features, and/or other such visualizations or information as described herein. In various embodiments, graphics, images, text, product recommendations, data, pixels, features, and/or other such visualizations or information may be received from provisioning server(s) 102 and/or merchant electronic provisioning network(s) (e.g., merchant servers 152 and/or 172) for display on the display screen of any one or more of user computer devices 111c1-111c3. Additionally, or alternatively, a user computer device may comprise, implement, have access to, render, or otherwise expose, at least in part, an interface or a guided user interface (GUI) for displaying text and/or images on its display screen.

In various embodiments, computing instructions and/or applications executing at the server (e.g., server(s) 102) and/or at a mobile device (e.g., mobile device 111c1 including provisioning app 111ap) may be communicatively connected for preventing electronic fraud by generation of ephemeral virtual cards for injection from secure proxy accounts into electronic provisioning network(s), as described herein. For example, one or more processors (e.g., processor(s) 104) of server(s) 102 may be communicatively coupled to a mobile device via a computer network (e.g., computer network 120). In such embodiments, a provisioning app may comprise a server app portion configured to execute on the one or more processors of the server (e.g., server(s) 102) and a mobile app portion configured to execute on one or more processors of the mobile device (e.g., any of one or more user computing devices 111c1-111c3 and/or 112c1-112c3).

In some embodiments, server(s) 102 may execute computing instructions 108 to generate ephemeral virtual card(s), for example, as described herein for FIGS. 3A-3D. Additionally, or alternatively, generation of ephemeral virtual card(s) may be provided via communication with a server or otherwise remote computing platform communicatively connected to server(s) 102 via computer network 120. For example, in some embodiments, server(s) 102 may be communicatively connected to ephemeral virtual card server 130. Ephemeral virtual card server 130 may be similarly configured as server(s) 102 for receiving, transmitting, or otherwise processing networked communications as described herein. For example, ephemeral virtual card server 130 may be any one or more cloud-based platform(s) such as MICROSOFT AZURE, AMAZON AWS, or the like. Ephemeral virtual card server 130 may include one or more processor(s) 134 as well as one or more computer memories 136. Ephemeral virtual card server 130 may further comprise an ephemeral virtual card API 138 (e.g., which may comprise a Representational State Transfer (RESTful) API) accessible via computer network 120. Ephemeral virtual card API 138 is configured to receive networked requests (e.g., POST, GET, and/or other such HTTP requests or otherwise networked based requests, such as remote procedure calls (RPC), etc.). Receipt of a request Ephemeral virtual card API 138 causes generation of and/or return or response of an ephemeral virtual card, for example, as described herein for FIGS. 3A-3D.

In some embodiments, virtual card server 130 is owned, operated, or controlled by the owner or operator of server(s) 102. Additionally, or alternatively, virtual card server 130 may be part of a same or similar server farm, cloud, or otherwise sever or cloud platform. In other embodiments, virtual card server 130 is remote to provisioning server(s) 102. In some embodiments, provisioning server(s) 102 may be provided or operated by a third-party. An example third-party that generates ephemeral virtual card(s) includes CORPORATE SPENDING INNOVATIONS (CSI). However, it is to be understood that other third-parties and/or remote server(s) may be used for generation of ephemeral virtual cards.

FIG. 1 further depicts merchant electronic provisioning network(s) (e.g., merchant server(s) 152 and merchant server(s) 172). Each of the merchant electronic provisioning network(s) may be similarly configured including having similar processors, memories, computing instructions, and otherwise as described herein for server(s) 102 for communicating over computer network 120 with server(s) 102. For example, merchant server(s) 152 and merchant server(s) 172 may each comprise multiple servers, which may include multiple, redundant, or replicated servers as part of a server farm. Server(s) 152 and server(s) 172 may be implemented as cloud-based servers, such as a cloud-based computing platform. For example, server(s) 152 and server(s) 172 may be any one or more cloud-based platform(s) such as MICROSOFT AZURE, AMAZON AWS, or the like. Merchant server(s) 152 and merchant server(s) 172 may include one or more processor(s) (e.g., processors 154 and 174, respectively) and as well as one or more computer memories (e.g., memories 156 and 176, respectively). In various embodiments, an ephemeral virtual card may be generated (e.g., by server(s) 102 and/or ephemeral virtual card server 130) to provide security during network communications with merchant electronic provisioning network(s) (e.g., merchant server(s) 152 and merchant server(s) 172). An ephemeral virtual card may also emulate a physical or electronic card acceptable by a merchant electronic provisioning network (e.g., of merchant server(s) 152 and merchant server(s) 172). In various embodiments, an ephemeral virtual card may be submitted to an electronic provisioning network of the merchant. Receipt of the ephemeral virtual card may cause initiation of a transaction between a user and the merchant for a given product.

In various embodiments, server(s) 152 and/or 172 may be or may be part of a given merchant electronic provisioning network. For example, in some embodiments, an electronic provisioning network of a merchant (e.g., server(s) 152 and/or 172) may comprise and/or part of an existing provisioning network, such as an existing electronic network of a specific merchant (e.g., TARGET, WALMART, AMAZON, etc.). Database 155 of server(s) 152 may store merchant product information (or other information as described herein) for a merchant electronic provisioning network operating server(s) 152. Similarly, database 175 of server(s) 172 may store merchant product information (or other information as described herein) of a merchant electronic provisioning network operating server(s) 152. In various embodiments, such product information may be accessible via computer network 120 via an API (e.g., RESTful API) by provisioning app 111*ap* and/or server(s) 102.

With reference to FIG. 1, in some embodiments, a provisioning app may be comprised a client portion configured to execute on a client device (e.g., client device 111*c*1) and a server portion configured to execute on a processor (e.g., processor(s) 104) of a server (e.g., server(s) 102). In such embodiments, the client portion may communicate, with the server portion via computer network 120, where the client portion and the server portion may communicate in order to implement the features and/or functionality described herein, for example, as describe herein with respect to FIG. 2. In such embodiments, the server app portion or the mobile app portion may each be configured to implement, or partially implement, one or more of: (1) receiving a provisioning request; (2) generating an ephemeral virtual card comprising a unique ephemeral code and a payment amount; and/or (3) submitting the ephemeral virtual card to the electronic provisioning network of the merchant, wherein receipt of the ephemeral virtual card causes initiation of a transaction between the user and the merchant for the product.

Figure 2:
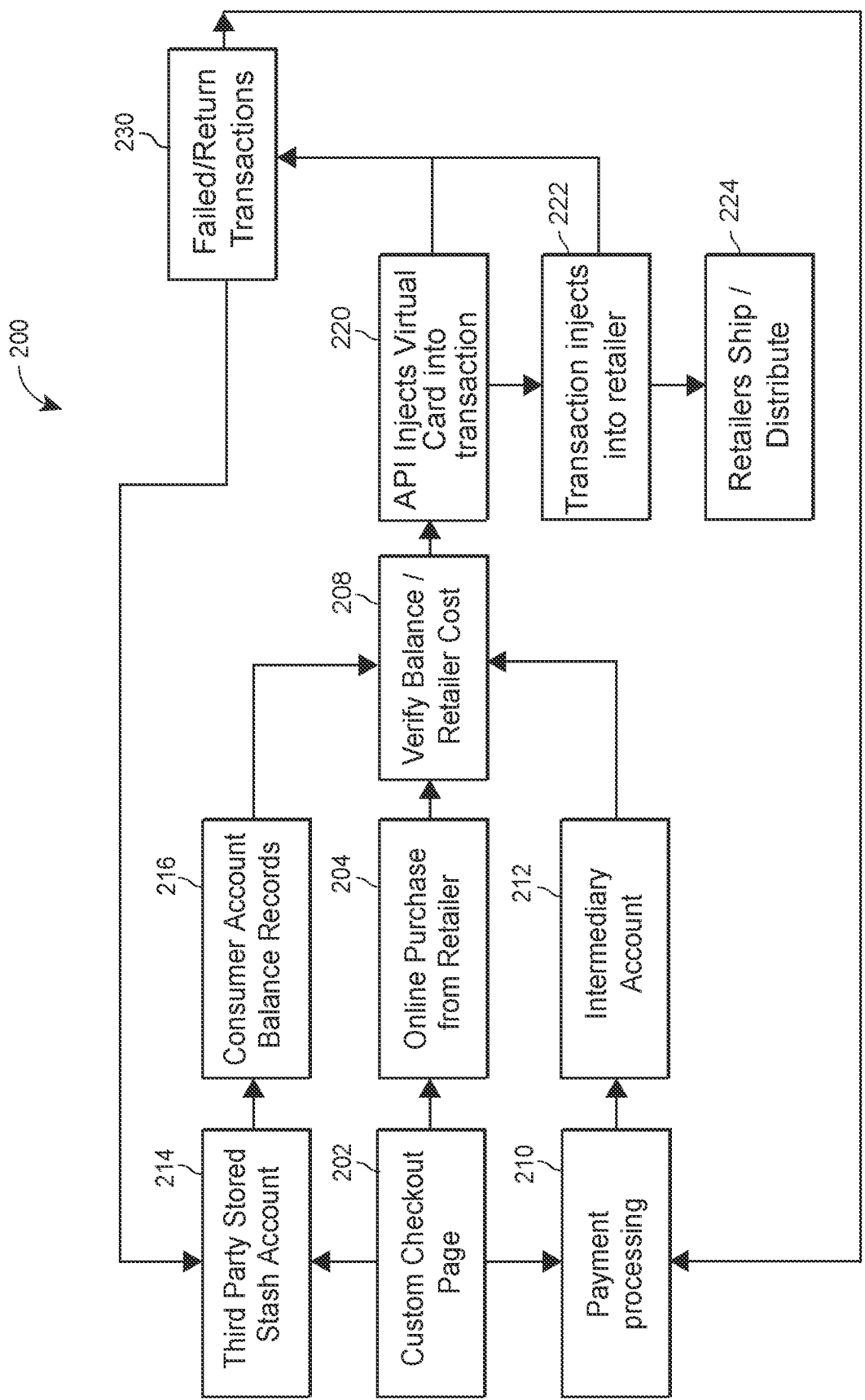
FIG. 2 illustrates an example secure product provisioning method for preventing electronic fraud by generation of ephemeral virtual cards for injection from secure proxy accounts into electronic provisioning networks, in accordance with various embodiments disclosed herein.

FIG. 2 illustrates an example secure product provisioning method 200 for preventing electronic fraud by generation of ephemeral virtual cards for injection from secure proxy accounts into electronic provisioning networks, in accordance with various embodiments disclosed herein. It is to be understood that while method 200 includes various blocks and features, alternative or additional secure product provisioning method(s) may implement any of, including all or only a portion of, such blocks and/or features of FIG. 2.

With reference to FIG. 2, at block 202 method 200 comprises generating, rendering, and/or or displaying a custom checkout page or app display. For example, such custom checkout page or app display may be generated, rendered, and/or or displayed by provisioning server(s) 102 (e.g., for a web page) and/or provisioning app executing on user computing device 111*c*1 (e.g., for a mobile application). The customization of the checkout page or app display may be based on available products of identified merchants that are able to fulfill a transaction, e.g., by shipping or otherwise providing the user's selected product. In some embodiments, the custom check page or app display may be generated on a per-call iteration based on, e.g., a real-time inventory of one or more merchants, or additionally and/or alternatively, an indicated inventory of one or more merchants. Additionally, or alternatively, such custom checkout page or app display may be based on a user's custom selections, such as which merchant(s) the user desires to receive products from and/or for which products. For example, a user may determine to purchase a product from a given brand or supplier (e.g., of a diaper product). As part of this determination, the user may select, from a checkout page or app display of a provisioning app, one of a variety of retailers or merchants to fulfill shipping and/or distribution of the selected product. Provisioning server(s) 102 (e.g., for a web page) and/or provisioning app executing on user computing device 111*c*1 (e.g., for a mobile application) may then generate a custom checkout page or app display with the user's desired content based on the user's selections.

In addition, in some embodiments, users may also choose to purchase a subscription, which, in some embodiments, may store the user's private information at the secure provisioning server or platform to protect the user's information. In a subscription model, a consumer may select to receive a product from a specific selected retailer, e.g., delivered within several days, and continue to receive the product based on the user's scheduled subscription window. For example, when registering, a user may be able to choose a specific product (e.g., diapers) that the user wants to subscribe to, as well as a preferred retailer (e.g., WALMART) from a list of available retailers that will ultimately fulfill a given transaction. The user can also store other personal information. For example, the user may also choose to add additional products (e.g., "add wipes") to the subscription. Such information can be stored together with the user's other secure information, including address, payment information, etc. Once stored, a user can at any time, a page or app of the provisioning server or platform to edit their subscriptions (e.g., cancel, deliver immediately, change retailer, and/or change product). Other settings are additionally possible. For example, a consumer may select whether the subscription will be billed weekly, biweekly, and/or as charged. In the case that a user selects the product for subscription (as described herein), provisioning server(s) 102 may be configured to select an alternative retailer or merchant in the event of an "Out of Stock" scenario. Such selection may also be utilized to target best price, fastest shipping, etc. for any one or more reorders of the selected product.

In still further embodiments, a user may receive customer relationship management (CRM) based communications. Such CRM communications may include reminders that a subscription is in transit, options to change a size of a subscription, or an option to change the reorder period. Opt-in CRM based email selections may link directly to the edit section of the app pages of the information provisioning server or platform so that a user can quickly manage his or her account.

With reference to FIG. 2, at block 204 method 200 comprises the user engaging in an online purchase, via the custom checkout page or app display as described for block 202. Such online purchase may comprise a product (e.g., a diaper product) for purchase by a merchant as previously selected by the user. The user may select a specific retailer or merchant for order fulfillment. More specifically, at block 204 secure product provisioning method 200 comprises receiving a provisioning request from a provisioning app (e.g., provisioning app 111*ap*). The provisioning request may be received at a provisioning server (e.g., provisioning server(s) 102) communicatively coupled via a computer network (e.g., computer network 120) to one or more merchant electronic provisioning networks (e.g., merchant server(s) 152 and merchant server(s) 172) corresponding to one or more merchants.

At block 208 method 200 comprises verifying a user's balance and comparing the balance to a selected merchant or retailer's cost for the product. In various embodiments, a merchant or retailers cost information, including shipping, may be populated (e.g., in custom page, app, or related data object) when a consumer makes a selection for a given merchant. The user's balance may be accessed via the user's account balance records (block 216) as secured on provisioning server(s) 102. In some embodiments, a user's balance may include, comprise, or otherwise have access to a gifting account (block 214), e.g., a "stash account." Such "stash account" may comprise a funds "gifted" to the user by friends, family, or otherwise third parties. In such embodiments, product provisioning app (e.g., product provisioning app 111*ap*) may be further configured to aggregate gift funds from one or more other users, and wherein the user submits the provisioning request from the provisioning app with a request to generate the ephemeral virtual card linking the gift funds. For example, in some embodiments, such gifts may comprise funds and/or recurring gifts through automated crowd-source gifting, enabling a user to use the crowd-sourced funds for product (e.g., diaper and wipes) purchases from traditional retailers both online and in store. Such gifts or funds may be secured or stored at provisioning server(s) 102, and may be made available, linked, and/or be accessible to the user when selecting and/or purchasing products.

At block 210 method 200 comprises payment processing, e.g., by provisioning server(s) 102, which may include accessing the user's account balance records (block 216) and/or gifting account (214) as described herein. More generally, the consumer may choose to purchase the product with a credit card, bank account, gift certificate, or by using a crowd-sourced stash account, where a payment is sourced from a third party.

At block 212 method 200 comprises processing order flow information through a secure intermediary account. For example, for any of the sources as described for block 210, payment processing flows from the user's account balance (block 216) and/or gifting account (214) to a secure account as protected by provisioning servers(s) 102. As referred to herein intermediary account (block 212) is a secured "proxy account" that provides a secure and protected source of funds for use with transactions with merchant(s) and/or retailers on behalf of the user. That is, the provisioning server(s) 102 handle sending secured information of a user via a secured communication to the user's specific and/or selected merchants. The proxy account is secure because it is protected and secured by the provisioning server(s) 102. It is a "proxy account" because the account serves as a proxy to distribute funds via the virtual card to the merchant for fulfillment of a transaction with a merchant). In some embodiments, owner, operator, or agent at its discretion may interject further funds, such as a coupon amount (reducing the cost to a consumer by $5 for example) or add a balance (e.g., issues $50 is available for a consumer to use) for signing up, promotions, support issues, etc.

At block 220 secure product provisioning method 200 comprises generating, via the provisioning server (e.g., provisioning servers(s) 102), an ephemeral virtual card comprising a unique ephemeral code and a payment amount. The payment amount is injected from a secure proxy account (e.g., intermediary account (block 212)) accessible only by the provisioning server (e.g., provisioning server(s) 102). In various embodiments, the ephemeral virtual card virtually emulates a physical or electronic card acceptable by the electronic provisioning network of the merchant. In this way, provisioning server(s) 102 may interact with existing merchant electronic provisioning network, on behalf of a user, thereby requiring minimal or no additional coding, overhead, processing resources, or memory of either the electronic provisioning network of the merchant and/or the provisioning server(s) 102. An example ephemeral virtual card is further described herein for FIGS. 3A-3D.

In additional embodiments, an ephemeral virtual card may be linked, adjusted, modified, or updated prior to transmission or use, e.g., via transmission to a merchant. For example, provisioning server(s) 102 may store an electronic account (e.g., comprising or as part of user's account balance records (block 216)) of the user comprising user information. At least a portion of the user information may be added to the ephemeral virtual card prior to submission to the electronic provisioning network of the merchant. For example, an ephemeral virtual card may be linked to the user's account balance records (block 216) for injection of user funds into ephemeral virtual card. In still further embodiments, an ephemeral virtual card may further comprise user credit card data (e.g., as determined from the user's profile information). The ephemeral virtual card may indicate that at least a portion of the payment amount is to be applied using the credit card data.

At block 222 secure product provisioning method 200 comprises injecting a unique virtual card (e.g., an ephemeral virtual card) on behalf of the user into a merchant electronic provisioning network (e.g., a retailer online Point of Sale platform).

At block 224 secure product provisioning method 200 comprises submitting, via the provisioning server, the ephemeral virtual card to the electronic provisioning network of the merchant. Receipt of the ephemeral virtual card may cause initiation of a transaction between the user and the merchant for the product. In some embodiments, the transaction may cause the merchant to ship, distribute, or otherwise provide the product to the user. For example, the transaction may comprise the merchant shipping or providing the product the user.

The transaction, and submission thereof to the merchant by provisioning server(s) 102, may be secured during communication and/or over time. The user's secured information may be provisionally provided, sent in parts, chunks, or otherwise securely provided to the merchant. For example, in some embodiments, secured zip code information corresponding to a physical address of the user may be protected from access by the secure proxy account (e.g., intermediary account 212). Such secured zip code information is not submitted to the electronic provisioning network of the merchant during a least a billing portion of the transaction. Additionally, or alternatively, the secured zip code information may be submitted during a separate electronic submission to the electronic provisioning network of the merchant in order to enhance security.

In additional embodiments, predetermined zip code information (e.g., such as place holder or alternative zip code information) may be provisionally provided with the billing portion of the transaction. Such predetermined zip code information may mask or hide the secured zip code information corresponding to the physical address of the user.

In still further embodiments, secured zip code information corresponding to a physical address of the user may be protected from access by the secure proxy account (e.g., intermediary account 212). Such secured zip code information may be submitted to the electronic provisioning network of the merchant provided during a least a billing portion of the transaction.

At block 230 secure product provisioning method 200 comprises, in the case of returns or failed transactions, that a failed ephemeral virtual card may relay a return or indication, indicating a return to the source of the funds, e.g., to a gifting account (block 214) and/or account balance (block 216) (e.g., which may comprise a bank account, credit card, stash account, etc.).

After a merchant or retailer processes the payment, the value is passed from the proxy account (e.g., intermediary account 212), and a sale is considered completed.

In some embodiments, provisioning server(s) 102 may receive transaction data regarding an amount of a transaction, its date, time, and/or location information Each transaction, and its related information, may be used to interact with the user, e.g., enable promotional activity of products provided via the provisioning system and/or methods described herein.

More generally, secure product provisioning method 200, product provisioning platform, provides various benefits. These include providing security and protection of a user's information by protecting and/or submitting user information in secure manner on the user's behalf. The secure product provisioning systems and methods may be implemented with existing merchant electronic provisioning networks therefore adding substantial functionality without requiring retailer system interface or change. This decreases processor and memory requirements of both existing merchant electronic provisioning networks and provisioning server(s) 102 at least because no additional code needs to be executed on processors or stored in memory of such systems to achieve customized communication.

In addition, secure product provisioning systems and methods are not dependent on pre-emptive measures by the third party such as an access code, in that that a given user can opt to partake in a transaction without such access code. In addition, the source of funds for a given transaction are not linked to a particular payment method and may be sourced from a gift fund, bank account, or other intermediary payment, which increases security given that such funds are protected via a proxy account as described herein. In this way, a given merchant has no access and/or no impact on the payment setup or process (and in the case of a subscription, a merchant can be automatically selected and can change for subsequent purchases based on changing supply issues, etc.). This is because a user's information is protected by provisioning server(s) and sent securely as part of an ephemeral virtual card that lasts only for the duration of a transaction and is issued in the consumers name to emulate a physical or electronic card acceptable by the electronic provisioning network of the merchant. Still further, such ephemeral virtual may be linked to a user or user account (e.g., consumer account balance records 216), and, therefore can be refunded, reprocessed, and/or tracked.

Still further, funds may be distributed to a variety of potential retailers or merchants that are dynamically selected as part of generation of a checkout page and/or display app. A user may engage in a multitude of transactions that are simulated as a single transaction, allowing the user to forgo pre-purchase activity with respect to various products and/or merchants.

FIG. 3A illustrates example computing instructions 300 for generating an ephemeral virtual card, in accordance with various embodiments disclosed herein. In some embodiments, computing instructions represent at least a portion of computing instructions 108 as described herein for FIG. 1. In the embodiment of FIG. 3A, computing instructions 300 comprise a client uniform resource locator POST based request to a third-party (e.g., CSI) for the generation of an ephemeral virtual card. More particularly, computing instructions 300 represent a networked call or instruction for card generation of an ephemeral virtual card (e.g., an ephemeral virtual card as described for FIG. 3B). Computing instructions 300 comprise an HTTP POST based request that submits data related to desired, secure transaction. The data is formatted in a JavaScript Object Notation (JSON) format and includes transaction details, including, by way of example, an amount (e.g., "45.50") and the first and last name of the user (e.g., "Michael" and "Jones," respectively). Other information is also provided as illustrated in FIG. 3A. While computing instructions 300 are represented as a POST request and its data is formatted in a JSON data format, it is to be understood that other request types and/or data formats may be used and are contemplated herein. For example, computing instructions 300 may comprise the same or similar request made in a programming language such as Python, JavaScript, Golang, C#, Java, and/or the like. Similarly, data formats may comprise extensible markup language (XML), dictionaries, key-value pairs, and/or other such data structures. In addition, such data formats may be formatted as plain text and/or encrypted data.

FIG. 3B illustrates an example ephemeral virtual card 350 generated based on execution of the computing instructions 300 as described for FIG. 3A, and in accordance with various embodiments disclosed herein. In the example of FIG. 3B, ephemeral virtual card 350 is a virtual fraud protection data structure or networked data object configured for secure transmission over a computer network (e.g., computer network 120). Ephemeral virtual card 350 is configured such that its values uniquely identify it to the provisioning server(s) 102 and/or ephemeral virtual card server 130. In this manner, that ephemeral virtual card 350 is redeemable, accessible, and/or useful only via communications with provisioning server(s) 102 and/or ephemeral virtual card server 130. Additionally, or alternatively, ephemeral virtual cards (e.g., ephemeral virtual card 350) is a single use object. That is, it is constructed for a specific transaction that may only be used for that specific transaction, and/or is not otherwise reusable. Any tampering with the value(s) (e.g., amount, user name, or address of a user, etc.) of ephemeral virtual card 350 compromises its integrity such that it becomes unusable. Configured as such, ephemeral virtual card 350 is secure even if transferred over a public network, such as the Internet.

In specific embodiments, an ephemeral virtual card (e.g., ephemeral virtual card 350) comprises a unique ephemeral code and a payment amount. The payment amount is injected from a secure proxy account (e.g., intermediary account block 212) accessible only by the provisioning server (e.g., provisioning server(s) 102). An ephemeral virtual card comprises a networked data structure or object configured to virtually emulate a physical or electronic card acceptable by the merchant's electronic provisioning network. For example, in various embodiments, an ephemeral virtual card, once generated, may be then injected into an HTTP payload and transmitted or submitted to an electronic provisioning network of a merchant (e.g., merchant server(s) 152 and merchant server(s) 172). The electronic provisioning network may differ by merchant as each merchant may deploy a different, custom, or otherwise proprietary network or platform that may be configured specific to a given merchant, on a merchant-by-merchant basis. Receipt of the ephemeral virtual card at the electronic provisioning network of a merchant may cause initiation of a transaction between a user and the merchant for a given product.

With reference to the example of FIG. 3B, ephemeral virtual card 350 comprises a unique ephemeral code, e.g., "cardNumber: 1234123455422214." The unique ephemeral code is configured to emulate a physical or electronic card acceptable by a merchant's electronic provisioning network. In the example of FIG. 3B, the unique ephemeral code emulates a 16-digit credit card number of a credit card company (e.g., VISA) acceptable by the merchant. Another example of a unique ephemeral code includes, e.g., "1234123455422214," which represents an example comprising a credit card based unique ephemeral code. A second example of a unique ephemeral code includes, e.g., "4151894984984984," which represents a non-credit card based unique ephemeral code. Each example may be used for a transaction, where a unique ephemeral code is unique or different compared to all other unique ephemeral codes generated and/or recognized by the ephemeral virtual card server 130 and/or provisioning server(s) 102. In various embodiments, the unique ephemeral code authenticates the transaction. The unique ephemeral code is included as part of the data payload of ephemeral virtual card 350.

More generally, ephemeral virtual card server 130 interprets an ephemeral virtual card as a unique code as opposed to a conventional payment method, as the number, or otherwise identifier, of the ephemeral virtual card is generated, stored, tracked, and/or analyzed by ephemeral virtual card server 130. In the embodiments of FIGS. 3A and 3B, computing instructions 300 and ephemeral virtual card 350 use programmatic link decoration, in which computing instructions 300 are configured for forming URL requests decorated with additional information for generation of ephemeral virtual card 350. The decorated additional information may not comprise all data (and may exclude personal identifiable information (PII)) to increase the security of the transmission. Such PII may exist on at provisioning server(s) 102 and/or ephemeral virtual card server 130, and may not be transmitted over a public network in order to prevent interception and protect such information from hackers or others. Without such PII information, a request for a transaction may be denied, therefore, further increasing the security of the networked ephemeral virtual card(s).

With reference to FIG. 3B, ephemeral virtual card 350 further comprises payment amount (e.g., "amount: 45.50"). The payment amount is the amount requested for generation of such ephemeral virtual card 350, as described for FIG. 3A. Other information is also included in the data payload of ephemeral virtual card 350, as illustrated in FIG. 3B. Such information includes the date "created" of ephemeral virtual card 350, and the "usage Types" allowed for a transaction. In some embodiments, such ephemeral virtual card 350 may further specify a specific merchant or merchants where ephemeral virtual card 350 is allowable. In such embodiments, ephemeral virtual card 350 is not usable or otherwise redeemable at any other merchant or for any other "usage Type."

In some embodiments, computing instructions 300, as executed by provisioning server(s) 102, may request generation of an ephemeral virtual card from ephemeral virtual card server 130. Such request may cause ephemeral virtual card server 130 to respond with ephemeral virtual card 350. Provisioning server(s) 102 may then inject ephemeral virtual card 350 through computer network 120 (e.g., via HTTP and/or HTTPS) through an API of a retailer system (e.g., a merchant electronic provisioning network, such as merchant servers 152).

In a specific example, provisioning server(s) 102, may request generation of an ephemeral virtual card from ephemeral virtual card server 130, which may return or otherwise respond with an ephemeral virtual card having a unique ephemeral code of "1234123455422214" and a payment amount of "$45.50." The computing instructions for generation of the ephemeral virtual card may specify that the ephemeral virtual card is only usable at "WALMART." Ephemeral virtual card server 130 then generates an ephemeral virtual card and transmits it to provisioning server(s) 102. Provisioning server(s) 102 may then submit ephemeral virtual card, or portions thereof (e.g., data or values therefrom), to an electronic provisioning network of the merchant (e.g., WALMART). The ephemeral virtual card is configured specific to the requirements of the merchant's (e.g., WALMART's) electronic provisioning network of the merchant (e.g., WALMART's specific network). Additionally, or alternatively, provisioning server(s) 102 may generate its own new, different, and/or proxy network data object, request, or call configured specific to the requirements of the merchant's (e.g., WALMART's) electronic provisioning network of the merchant (e.g., WALMART's specific network). In various embodiments, the merchant may then use the information contained in a data payload of the ephemeral virtual card by requesting payment and/or other transaction information from ephemeral virtual card server 130, e.g., to fulfil a transaction or order with a user. A merchant may not be aware that the transaction was based on an ephemeral virtual card.

In various embodiments, virtual card server 130, receiving a request funds based on an ephemeral virtual card, may validate the ephemeral virtual card, clear the payment, mark it as complete, and prevent the ephemeral virtual card from being used again, thereby increasing security of the networked transaction. In this way, computing instructions 300 together with such ephemeral virtual card(s) (e.g., ephemeral virtual card 350) coordinates a multi-tiered or multi-stepped secure transaction across a public network, such as the Internet.

In various embodiments, an ephemeral virtual card may be submitted as encrypted to an electronic provisioning network of the merchant e.g., of merchant server(s) 152 and merchant server(s) 172. Alternatively, because ephemeral virtual cards are redeemable, accessible, and/or useful via communications only with provisioning server(s) 102 and/or ephemeral virtual card server 130, then, in some embodiments, an ephemeral virtual card, or portions thereof, may also be submitted as plain text to an electronic provisioning network of the merchant e.g., of merchant server(s) 152 and merchant server(s) 172. This is because the information of the ephemeral virtual card would be useless to a hacker or third-party who intercepted such information. Such hacker or third-party would be unable to redeem, access, and/or use the ephemeral virtual card at least because any access request for its use would need come from the specific merchant for which it was generated. Ephemeral virtual cards (e.g., ephemeral virtual card 350) is a single use object. That is, it is constructed for a specific transaction, may only be used for that transaction, and/or is not reusable. In this way, an ephemeral virtual card is fraud proof because once a virtual card is processed it is no longer valid. The ephemeral virtual card is also locked at a specific amount, and merchant and/or merchant type, which is acknowledged and checked by provisioning server(s) 102 and/or ephemeral virtual card server 130 for security purposes. Packaged along with the ephemeral virtual card is user's private information, permitting a merchant to complete, distribute, provide, or otherwise fulfill the order of the product via a protected transaction.

In some embodiments, an ephemeral virtual card may be generated specifically for the amount necessary for the transaction. In the case of multiple transactions, an ephemeral virtual card is created for each transaction. This may occur even though the source of the funds to the provisioning server(s) 102, or owner, operator, or agent thereof, may be of a total amount for multiple transactions. To the user, the multiple transactions, however, would appear as a single transaction.

In some embodiments, ephemeral virtual card 350 exists only for a short duration or time. For example, in some embodiments ephemeral virtual card 350 expires when received by an electronic provisioning network of a merchant (e.g., of merchant server(s) 152 and merchant server(s) 172). Additionally, or alternatively, a unique ephemeral code (e.g., ephemeral virtual card 350) may become invalid within a period of time. For example, the period of time may be very short, including within 1 millisecond to 10 milliseconds, or thereabouts. Invalidation of an ephemeral virtual card may occur upon provisioning server(s) 102 and/or ephemeral virtual card server 130 sending the unique ephemeral code (e.g., ephemeral virtual card 350) to a merchant. Still further, invalidation of an ephemeral virtual card may occur upon request of a merchant for payment from ephemeral virtual card server 130 and provisioning server(s) 102, e.g., from intermediary account 212.

FIG. 3C illustrates example computing instructions 350 for checking status or activity of an ephemeral virtual card, in accordance with various embodiments disclosed herein. Checking status or activity of an ephemeral virtual card allows provisioning server(s) 102 and/or merchant servers (e.g., merchant servers 152 and/or merchant servers 172) to check whether or the ephemeral virtual card has been used or is otherwise valid. Computing instructions 350 comprise an HTTP request to ephemeral virtual card server 130. In the example of FIG. 3D, computing instructions 350 comprise request instructions for initiating a request to ephemeral virtual card server 130 for an ephemeral virtual card having identifier "68491." The ephemeral virtual card server 130 returns a validation response as described for FIG. 3D.

FIG. 3D illustrates an example validity response 375 indicating an error as to the ephemeral virtual card of FIG. 3C, in accordance with various embodiments disclosed herein. Validity response 375 indicates that the transaction status is "Declined" with a message of "MCC IS NOT AVAILABLE FOR USE." A corrective action message is provided that specifies to "VERIFY USAGE LIMITS AND ADJUST CARD PROFILE." The Merchant Category Code (MCC) is specific to a certain merchant category or class. Generally, an MCC comprises a four-digit number. The number denotes the type of business or service a given merchant is in. An MCC is used by credit card networks (e.g., VISA, MASTERCARD, etc.) to categorize, track or restrict certain types of purchases. In the example of FIG. 3D, the validity response 375 indicates that the ephemeral virtual card (as described for FIG. 3C) is in an invalidity state given that the MCC is malformed with respect to the intended merchant and/or usage of the ephemeral virtual card. Therefore, validity response 375 indicates that the ephemeral virtual card would be unusable.

Validity response 375 represents a single type of validation error. An additional validation error includes initiation of a request generation of an ephemeral virtual card, but where the request has missing required fields (e.g., an amount). Checking the validity of an ephemeral virtual card that was generated with a request having missing fields will result in a validation error. In addition, attempting to query an ID of an ephemeral virtual card that does not exist will also result in a validation error (e.g., a related error message may comprise: "attempting to query the ID of a card that does not exist in the current company virtual card cannot be found for ID: 68491").

Each of these validation (or invalidation) checks, errors, and/or responses, e.g., as described for FIG. 3D, represent a protective aspect of the provisioning systems and methods where ephemeral virtual cards are generated (and are validated) only for specific usages and/or for different merchants thereby increasing security of transmission of ephemeral virtual cards via public networks, such as the Internet.

Figure 4:
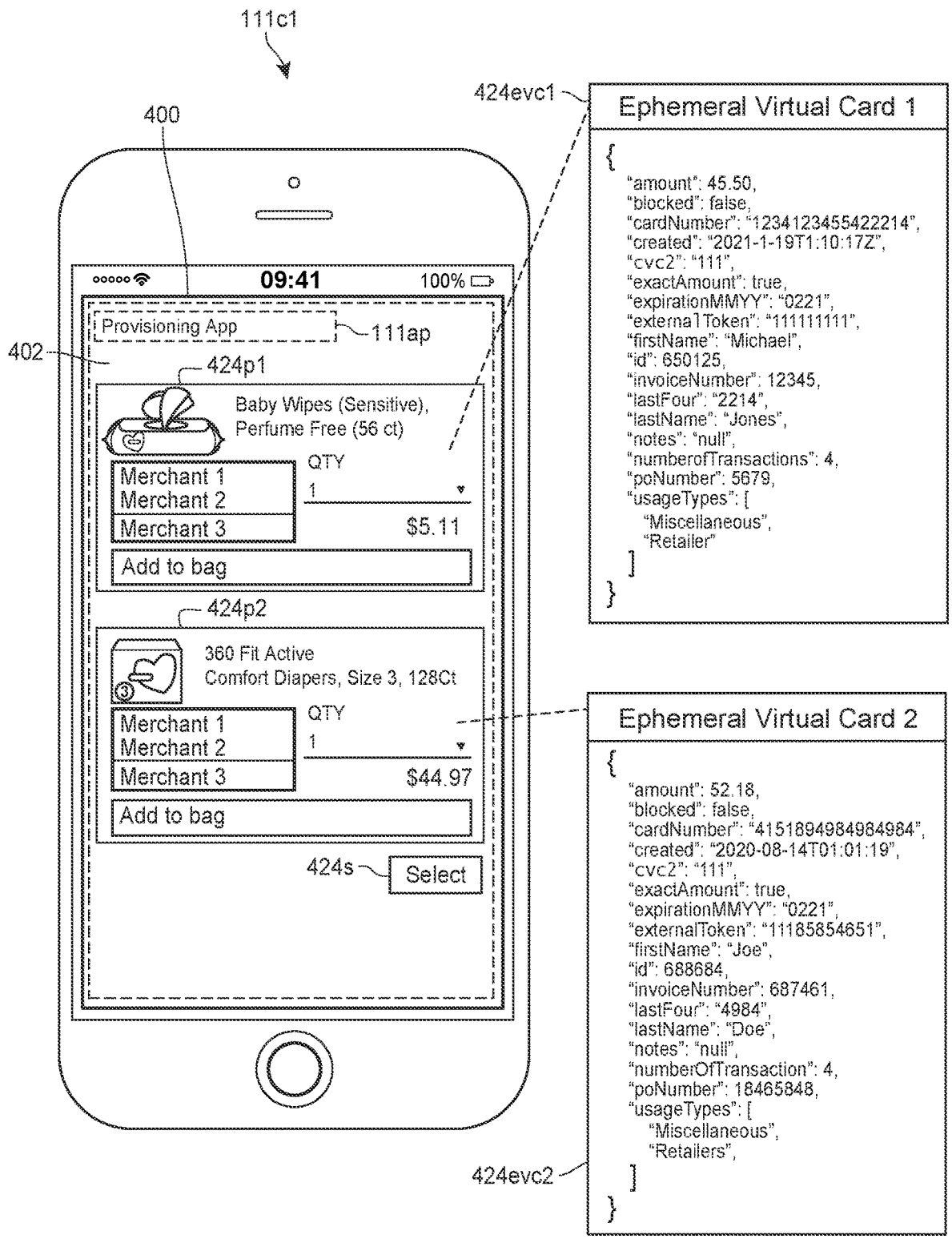
FIG. 4 illustrates an example graphic user interface (GUI) as rendered or displayed on a screen of a client device and depicting one or more products for provision by or otherwise to be provided by one or more merchants in accordance with various embodiments disclosed herein.

FIG. 4 illustrates an example graphic user interface (GUI) as rendered or displayed on a screen of a client device and depicting one or more products for provision by or otherwise to be provided by one or more merchants in accordance with various embodiments disclosed herein. For example, as shown in the example of FIG. 4, user interface 402 may be implemented or rendered via an application (e.g., provisioning app 111ap) executing on user computing device 111c1. As shown in the example of FIG. 4, user interface 402 may be implemented or rendered via a native app executing on user computing device 111c1. In the example of FIG. 4, user computing device 111c1 is a user computer device as described for FIG. 1, e.g., where 111c1 is illustrated as an APPLE iPhone that implements the APPLE iOS operating system and that has display screen 400. User computing device 111c1 may execute one or more native applications (apps) on its operating system, including, for example, provisioning app as described herein. Such native apps may be implemented or coded (e.g., as computing instructions) in a computing language (e.g., SWIFT) executable by the user computing device operating system (e.g., APPLE iOS) by the processor of user computing device 111c1.

Additionally, or alternatively, user interface 402 may be implemented or rendered via a web interface, such as via a web browser application, e.g., Safari and/or Google Chrome app(s), or other such web browser or the like.

As shown in the example of FIG. 4, user interface 402 comprises a GUI configured to display, on a screen of the user computing device, one or more products (e.g., product 424p1 and product 424p2) to be provided by the one or more merchants (e.g., Merchant 1, Merchant 2, and/or Merchant 3). User interface 402, may be custom generated, as described herein, for block 202 of method 200 of FIG. 2. In the example of FIG. 4, interface 402 comprises a custom app display. Such custom app display may be generated, rendered, and/or or displayed by provisioning app 111ap executing on user computing device 111c1.

Provisioning app 111ap renders merchant selections for products 424p1 and 424p2 on a GUI corresponding to one or more merchants. The merchant selections are determined based on available inventory of the one or more products as provided by the one or more merchants. For example, in the example of FIG. 4, product 424p2 is a disposable absorbent article. More specifically, product 424p1 is baby wipes. Product 424p2 is a diaper or pack of diapers (e.g., a carton of size 3 diapers). Each of the products may be sourced from various merchants (e.g., Merchant 1, Merchant 2, and/or Merchant 3), which may be selected by the user. It is to be understood that other products, types of products, or other items or merchandise are also contemplated herein.

User interface 402 may further include a selectable UI button 424s to allow the user to select for purchase or shipment a corresponding product (e.g., product 424p1 and/or product 424p2. Selection of selectable UI button 424s may cause a respective ephemeral virtual card (e.g., ephemeral virtual card 424evc1 and/or ephemeral virtual card 424evc2) to be submitted to respective electronic provisioning network(s) of a corresponding merchant. Each of the ephemeral virtual cards (e.g., ephemeral virtual card 424evc1 and/or ephemeral virtual card 424evc2) are generated for separate transactions, even though to the user it may appear as though a single transaction (or order) being implemented. For example, ephemeral virtual card 424evc1 is generated (e.g., by ephemeral virtual card server 130) for product 424p1. The request to generate ephemeral virtual card 424evc1 (e.g., as requested by computing instructions 300) comprises the exact amount ("45.50") for product 424p1, the user's first and last name ("Michael" and "Jones," respectively), and the various "usageTypes" that the ephemeral virtual card may be used for (e.g., "Retailer"). The "Business" usage Type specifies an allowed merchant type of the merchant (e.g., "Merchant 1") that will fulfill the transaction. As shown for FIG. 4, the ephemeral virtual card 424evc1 is generated and returned with a unique ephemeral code of "1234123455422214." This unique ephemeral code is different from all other ephemeral codes that can be validated at ephemeral virtual card server 130. Ephemeral virtual card 424evc1 is redeemable (e.g., by the merchant) and/or otherwise usable a single time for the given transaction specific to product 424p1.

Ephemeral virtual card 424evc2 is generated separately (e.g., for a separate transaction, which may be via a separate merchant), but for the same overall order, at least from the perspective of the user. Ephemeral virtual card 424evc2 is generated (e.g., by ephemeral virtual card server 130) for product 424p2. The request to generate ephemeral virtual card 424evc2 (e.g., as requested by computing instructions 300) comprises the exact amount ("52.18") for product 424p2, the user's first and last name ("Joe" and "Doe," respectively), and the various "usageTypes" that the ephemeral virtual card may be used for (e.g., "Retailer"). The "Retailer" usage Type specifies an allowed merchant type of the merchant (e.g., "Merchant 2") that will fulfill the transaction. As shown for FIG. 4, the ephemeral virtual card 424evc2 is generated or created at separate time and returned with a unique ephemeral code of "4151894984984984." This unique ephemeral code is different from all other ephemeral codes that can be validated at ephemeral virtual card server 130. Ephemeral virtual card 424evc2 is redeemable (e.g., by the merchant) and/or otherwise usable a single time for the given transaction specific to product 424p2.

Similarly, each of the ephemeral virtual cards (e.g., ephemeral virtual card 424evc1 and/or ephemeral virtual card 424evc2) are submitted via separate transactions, even though to the user it may appear as though a single transaction (or order) being implemented. A corresponding provisioning request, as submitted from 111ap to provisioning server(s) 102, may indicate a product selected from one or more products and a merchant selected from one or more merchants. Such ephemeral virtual cards may different data, codes, and are generated by provisioning server(s) 102. This further increases security of the system by keeping transaction information separate. For example, in various embodiments, a provisioning request as sent from provisioning app 111p, may indicate a first product (e.g., product 424p1) and a second product (e.g., product 424p2), where each of the first and a second products are selected from one or more products and a one or more merchants (e.g., Merchant 1, Merchant 2, and/or Merchant 3) as shown in FIG. 4. Ephemeral virtual card 424evc1 and ephemeral virtual card 424evc2a cards may be generated each comprising a respective unique ephemeral codes and a payment amounts. The ephemeral virtual card 424evc1 and ephemeral virtual card 424evc2a cards may be specifically generated to be sent to electronic provisioning networks and/or servers of specific merchant electronic provisioning networks. For example, ephemeral virtual card 424evc1 may be generated specifically for electronic provisioning network operating server(s) 152 of a first merchant (e.g., Merchant 1). Similarly, ephemeral virtual card 424evc2 may be generated specifically for electronic provisioning network operating server(s) 172 of a second merchant (e.g., Merchant 2). Each of the ephemeral virtual card 424evc1 and ephemeral virtual card 424evc2a cards are generated to virtually emulate a physical or electronic card acceptable by the respective first or second merchant, as the case may be. The ephemeral virtual card may be submitted to the first and second merchant's respective electronic provisioning networks. Receipt of the ephemeral virtual card 424evc1 and ephemeral virtual card 424evc2a at the respective merchant electronic provisioning networks may cause initiation of a respective transaction between the user and the first and second merchants for each of the first product (e.g., product 424p1) and a second product (e.g., product 424p2).

Generally, receipt of an ephemeral virtual card (e.g., ephemeral virtual card 424evc1 and ephemeral virtual card 424evc2a) causes initiation of a transaction between the user and the merchant for the product. For example, submission of the ephemeral virtual cards (e.g., ephemeral virtual card 424evc1 and/or ephemeral virtual card 424evc2) may cause product(s) to be shipped to the user. For example, either user computing device 111c1 and/or provisioning server(s) 102 may initiate, based on a user selection, the product 424p1 (e.g., a diaper product) for shipment to the user from a first merchant, and further initiate, based on a user selection, the product 424p2 (e.g., a baby wipe) for shipment to the user from a second merchant. In such embodiments, the product may be packaged and shipped to the user by a specific merchant as selected by the user.

The secure product provisioning systems and methods of the present disclosure may be configured to integrate with existing software platforms, such as school (or daycare) software platforms, allowing for the secure purchase by parents of items to be received and consumed by the school (or daycare). For example, the secure product provisioning system and methods of the present disclosure may be configured to be an external service, such as payment processing service, of the tracking systems and methods disclosed in U.S. patent application Ser. No. 17/514,027.

ASPECTS OF THE DISCLOSURE

The following aspects are provided as examples in accordance with the disclosure herein and are not intended to limit the scope of the disclosure.

1. A secure product provisioning system configured to prevent electronic fraud by generation of ephemeral virtual cards for injection from secure proxy accounts into electronic provisioning networks, the secure product provisioning system comprising: a provisioning server comprising one or more processors and one or more memories, the provisioning server communicatively coupled via a computer network to one or more merchant electronic provisioning networks, each of the one or more merchant electronic provisioning networks corresponding to one or more merchants; a provisioning application (app) comprising computing instructions configured for implementation on a client device of a user, the provisioning app communicatively coupled via the computer network to the provisioning server, the provisioning app comprising a graphic user interface (GUI) configured to display, on a screen of the client device, one or more products to be provided by the one or more merchants; and computing instructions configured to execute on the one or more processors of the provisioning server, wherein the computing instructions, when executed by the one or more processors, cause the provisioning server to: receive a provisioning request from the provisioning app, the provisioning request indicating a product selected from the one or more products and a merchant selected from the one or more merchants, generate an ephemeral virtual card comprising a unique ephemeral code and a payment amount, wherein the payment amount is injected from a secure proxy account accessible only by the provisioning server, and wherein the ephemeral virtual card virtually emulates a physical or electronic card acceptable by the electronic provisioning network of the merchant, and submit the ephemeral virtual card to the electronic provisioning network of the merchant, wherein receipt of the ephemeral virtual card causes initiation of a transaction between the user and the merchant for the product.

2. The secure product provisioning system of aspect 1, wherein the unique ephemeral code authenticates the transaction.

3. The secure product provisioning system of any one of aspects 1 or 2, wherein the ephemeral virtual card expires when received by the electronic provisioning network of the merchant.

4. The secure product provisioning system of any one of aspects 1-3, wherein unique ephemeral code becomes invalid when within a period of time.

5. The secure product provisioning system of aspect 4, wherein the period of time comprises 1 millisecond to 10 milliseconds.

6. The secure product provisioning system of any one of aspects 1-4, wherein the provisioning app is any one or more of: a web browser application, a mobile application, or a desktop application.

7. The secure product provisioning system of any one of aspects 1-5, wherein the provisioning app renders merchant selections on the GUI corresponding to one or more merchants, and wherein the merchant selections are determined based on available inventory of the one or more products as provided by the one or more merchants.

8. The secure product provisioning system of any one of aspects 1-6, wherein the ephemeral virtual card is submitted as encrypted to the electronic provisioning network of the merchant.

9. The secure product provisioning system of any one of aspects 1-7, wherein the ephemeral virtual card is submitted as plain text to the electronic provisioning network of the merchant.

10. The secure product provisioning system of any one of aspects 1-8, wherein the transaction comprises the merchant shipping or providing the product the user.

11. The secure product provisioning system of any one of aspects 1-9, wherein the product comprises a disposable absorbent article.

12. The secure product provisioning system of aspect 11, wherein the disposable absorbent article is a diaper.

13. The secure product provisioning system of any one of aspects 1-12, wherein the product provisioning app is further configured to aggregate gift funds from one or more other users, and wherein the user submits the provisioning request from the provisioning app with a request to generate the ephemeral virtual card linking the gift funds.

14. The secure product provisioning system of any one of aspects 1-13 wherein the ephemeral virtual card is linked to an account balance of the user.

15. The secure product provisioning system of any one of aspects 1-14, wherein the ephemeral virtual card further comprises credit card data, and wherein the ephemeral virtual card indicates that at least a portion of the payment amount is to be applied using the credit card data.

16. The secure product provisioning system of any one of aspects 1-15, wherein the provisioning server stores an electronic account of the user comprising user information, and wherein at least a portion of the user information is added to the ephemeral virtual card prior to submission to the electronic provisioning network of the merchant.

17. The secure product provisioning system of any one of aspects 1-16, wherein the provisioning request further indicates a second product selected from the one or more products and a second merchant selected from the one or more merchants, wherein a second ephemeral virtual card comprising a second unique ephemeral code and a second payment amount is generated, wherein the second ephemeral virtual card virtually emulates a physical or electronic card acceptable by the second merchant, and wherein the ephemeral virtual card is submitted to a second merchant electronic provisioning network of the second merchant, wherein receipt of the second ephemeral virtual card at the second merchant electronic provisioning network causes initiation of a second transaction between the user and the second merchant for the second product.

18. The secure product provisioning system of any one of aspects 1-17, wherein the electronic provisioning network is an existing provisioning network.

19. The secure product provisioning system of any one of aspects 1-18, wherein secured zip code information corresponding to a physical address of the user is protected from access by the secure proxy account, and where the secured zip code information is not submitted to the electronic provisioning network of the merchant provided during a least a billing portion of the transaction.

20. The secure product provisioning system of aspect 19, wherein the secured zip code information is submitted during a separate electronic submission to the electronic provisioning network of the merchant, the secured zip code information provided to facilitate shipment of the product to the user.

21. The secure product provisioning system of any one of aspects 1-20, wherein predetermined zip code information is provisionally provided with the billing portion of the transaction, the predetermined zip code information masking the secured zip code information corresponding to the physical address of the user.

22. The secure product provisioning system of any one of aspects 1-21, wherein secured zip code information corresponding to a physical address of the user is protected from access by the secure proxy account, and where the secured zip code information is submitted to the electronic provisioning network of the merchant provided during a least a billing portion of the transaction.

23. A secure product provisioning method for preventing electronic fraud by generation of ephemeral virtual cards for injection from secure proxy accounts into electronic provisioning networks, the secure product provisioning method comprising: receiving, at a provisioning server communicatively coupled via a computer network to one or more merchant electronic provisioning networks corresponding to one or more merchants, a provisioning request from a provisioning application (app), wherein the provisioning app comprises: (a) computing instructions configured for implementation on a client device of a user, and (b) a graphic user interface (GUI) configured to display, on a screen of the client device, one or more products to be provided by the one or more merchants, wherein the provisioning request indicates a product selected from one or more products and a merchant selected from one or more merchants; generating, via the provisioning server, an ephemeral virtual card comprising a unique ephemeral code and a payment amount, wherein the payment amount is injected from a secure proxy account accessible only by the provisioning server, and wherein the ephemeral virtual card virtually emulates a physical or electronic card acceptable by the electronic provisioning network of the merchant; and submitting, via the provisioning server, the ephemeral virtual card to the electronic provisioning network of the merchant, wherein receipt of the ephemeral virtual card causes initiation of a transaction between the user and the merchant for the product.

24. A tangible, non-transitory computer-readable medium storing instructions preventing electronic fraud by generation of ephemeral virtual cards for injection from secure proxy accounts into electronic provisioning networks, that when executed by one or more processors of a provisioning server cause the one or more processors to: receive a provisioning request from a provisioning application (app), the provisioning app comprising: (a) computing instructions configured for implementation on a client device of a user, and (b) a graphic user interface (GUI) configured to display, on a screen of the client device, one or more products to be provided by the one or more merchants, wherein the provisioning request indicates a product selected from the one or more products and a merchant selected from one or more merchants, and wherein the provisioning server is communicatively coupled via a computer network to the one or more merchant electronic provisioning networks corresponding to one or more merchants; generate an ephemeral virtual card comprising a unique ephemeral code and a payment amount, wherein the payment amount is injected from a secure proxy account accessible only by the provisioning server, and wherein the ephemeral virtual card virtually emulates a physical or electronic card acceptable by the electronic provisioning network of the merchant; and submit the ephemeral virtual card to the electronic provisioning network of the merchant, wherein receipt of the ephemeral virtual card causes initiation of a transaction between the user and the merchant for the product.

Additional Considerations

Although the disclosure herein sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. A person of ordinary skill in the art may implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A secure product provisioning system configured to prevent electronic fraud by generation of ephemeral virtual cards for injection from secure proxy accounts into electronic provisioning networks, the secure product provisioning system comprising:
    a provisioning server comprising one or more processors and one or more memories, the provisioning server communicatively coupled via a computer network to one or more merchant electronic provisioning networks, each of the one or more merchant electronic provisioning networks corresponding to one or more merchants;
    a provisioning application (app) comprising computing instructions configured for implementation on a client device of a user, the provisioning app communicatively coupled via the computer network to the provisioning server, the provisioning app comprising a graphic user interface (GUI) configured to display, on a screen of the client device, one or more products to be provided by the one or more merchants; and
    computing instructions configured to execute on the one or more processors of the provisioning server, wherein the computing instructions, when executed by the one or more processors, cause the provisioning server to:
        receive a provisioning request from the provisioning app, the provisioning request indicating a product selected from the one or more products and a merchant selected from the one or more merchants,
        generate an ephemeral virtual card comprising a unique ephemeral code and a payment amount, wherein the payment amount is injected from a secure proxy account accessible only by the provisioning server, and wherein the ephemeral virtual card virtually emulates a physical or electronic card acceptable by the electronic provisioning network of the merchant, and
        submit the ephemeral virtual card to the electronic provisioning network of the merchant, wherein receipt of the ephemeral virtual card causes initiation of a transaction between the user and the merchant for the product.

2. The secure product provisioning system of claim 1, wherein the unique ephemeral code authenticates the transaction.

3. The secure product provisioning system of claim 1, wherein the ephemeral virtual card expires when received by the electronic provisioning network of the merchant.

4. The secure product provisioning system of claim 1, wherein the unique ephemeral code becomes invalid when within a period of time.

5. The secure product provisioning system of claim 4, wherein the period of time comprises 1 millisecond to 10 milliseconds.

6. The secure product provisioning system of claim 1, wherein the provisioning app is any one or more of: a web browser application, a mobile application, or a desktop application.

7. The secure product provisioning system of claim 1,
    wherein the provisioning app renders merchant selections on the GUI corresponding to one or more merchants, and
    wherein the merchant selections are determined based on available inventory of the one or more products as provided by the one or more merchants.

8. The secure product provisioning system of claim 1, wherein the ephemeral virtual card is submitted as encrypted to the electronic provisioning network of the merchant.

9. The secure product provisioning system of claim 1, wherein the ephemeral virtual card is submitted as plain text to the electronic provisioning network of the merchant.

10. The secure product provisioning system of claim 1, wherein the transaction comprises the merchant shipping or providing the product to the user.

11. The secure product provisioning system of claim 1, wherein the product comprises a disposable absorbent article.

12. The secure product provisioning system of claim 11, wherein the disposable absorbent article is a diaper.

13. The secure product provisioning system of claim 1, wherein the product provisioning app is further configured to aggregate gift funds from one or more other users, and wherein the user submits the provisioning request from the provisioning app with a request to generate the ephemeral virtual card linking the gift funds.

14. The secure product provisioning system of claim 1, wherein the ephemeral virtual card is linked to an account balance of the user.

15. The secure product provisioning system of claim 1, wherein the ephemeral virtual card further comprises credit card data, and
wherein the ephemeral virtual card indicates that at least a portion of the payment amount is to be applied using the credit card data.

16. The secure product provisioning system of claim 1, wherein the provisioning server stores an electronic account of the user comprising user information, and
wherein at least a portion of the user information is added to the ephemeral virtual card prior to submission to the electronic provisioning network of the merchant.

17. The secure product provisioning system of claim 1, wherein the provisioning request further indicates a second product selected from the one or more products and a second merchant selected from the one or more merchants,
wherein a second ephemeral virtual card comprising a second unique ephemeral code and a second payment amount is generated, wherein the second ephemeral virtual card virtually emulates a physical or electronic card acceptable by the second merchant, and
wherein the second ephemeral virtual card is submitted to a second merchant electronic provisioning network of the second merchant, wherein receipt of the second ephemeral virtual card at the second merchant electronic provisioning network causes initiation of a second transaction between the user and the second merchant for the second product.

18. The secure product provisioning system of claim 1, wherein the electronic provisioning network is an existing provisioning network.

19. The secure product provisioning system of claim 1, wherein secured zip code information corresponding to a physical address of the user is protected from access by the secure proxy account, and where the secured zip code information is not submitted to the electronic provisioning network of the merchant provided during a least a billing portion of the transaction.

20. The secure product provisioning system of claim 19, wherein the secured zip code information is submitted during a separate electronic submission to the electronic provisioning network of the merchant, the secured zip code information provided to facilitate shipment of the product to the user.

21. The secure product provisioning system of claim 1, wherein predetermined zip code information is provisionally provided with the billing portion of the transaction, the predetermined zip code information masking the secured zip code information corresponding to the physical address of the user.

22. The secure product provisioning system of claim 1, wherein secured zip code information corresponding to a physical address of the user is protected from access by the secure proxy account, and where the secured zip code information is submitted to the electronic provisioning network of the merchant provided during a least a billing portion of the transaction.

23. A secure product provisioning method for preventing electronic fraud by generation of ephemeral virtual cards for injection from secure proxy accounts into electronic provisioning networks, the secure product provisioning method comprising:
receiving, at a provisioning server communicatively coupled via a computer network to one or more merchant electronic provisioning networks corresponding to one or more merchants, a provisioning request from a provisioning application (app), wherein the provisioning app comprises:
(a) computing instructions configured for implementation on a client device of a user, and
(b) a graphic user interface (GUI) configured to display, on a screen of the client device, one or more products to be provided by the one or more merchants,
wherein the provisioning request indicates a product selected from one or more products and a merchant selected from one or more merchants;
generating, via the provisioning server, an ephemeral virtual card comprising a unique ephemeral code and a payment amount,
wherein the payment amount is injected from a secure proxy account accessible only by the provisioning server, and
wherein the ephemeral virtual card virtually emulates a physical or electronic card acceptable by the electronic provisioning network of the merchant; and
submitting, via the provisioning server, the ephemeral virtual card to the electronic provisioning network of the merchant, wherein receipt of the ephemeral virtual card causes initiation of a transaction between the user and the merchant for the product.

24. A tangible, non-transitory computer-readable medium storing instructions preventing electronic fraud by generation of ephemeral virtual cards for injection from secure proxy accounts into electronic provisioning networks, that when executed by one or more processors of a provisioning server cause the one or more processors to:
receive a provisioning request from a provisioning application (app), the provisioning app comprising:
(a) computing instructions configured for implementation on a client device of a user, and
(b) a graphic user interface (GUI) configured to display, on a screen of the client device, one or more products to be provided by the one or more merchants,
wherein the provisioning request indicates a product selected from the one or more products and a merchant selected from one or more merchants, and
wherein the provisioning server is communicatively coupled via a computer network to the one or more merchant electronic provisioning networks corresponding to one or more merchants;
generate an ephemeral virtual card comprising a unique ephemeral code and a payment amount,
wherein the payment amount is injected from a secure proxy account accessible only by the provisioning server, and
wherein the ephemeral virtual card virtually emulates a physical or electronic card acceptable by the electronic provisioning network of the merchant; and
submit the ephemeral virtual card to the electronic provisioning network of the merchant, wherein receipt of the ephemeral virtual card causes initiation of a transaction between the user and the merchant for the product.

\* \* \* \* \*